March 31, 1931.  J. A. ALLEN ET AL  1,798,775
AUTOMATIC TOBACCO SCRAP MEASURING MACHINE
Filed July 2, 1927   4 Sheets-Sheet 1
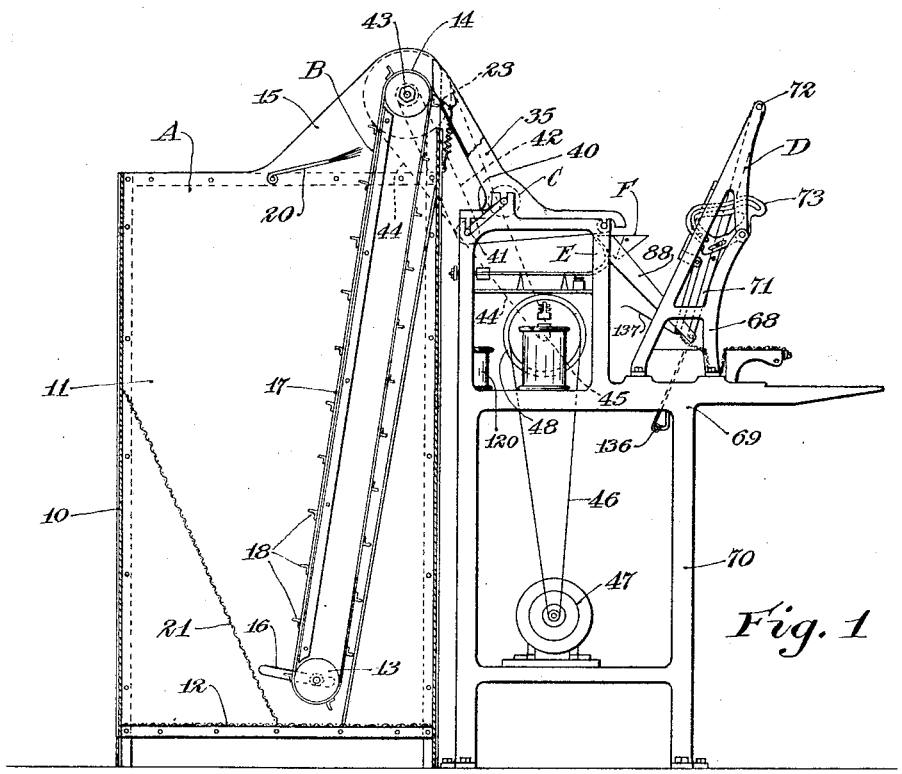
Fig. 1
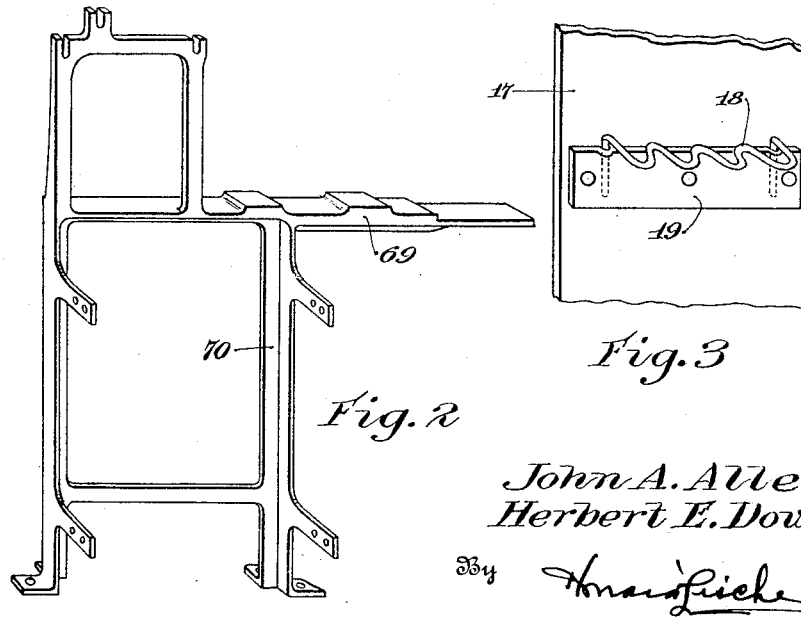
Fig. 2
Fig. 3
Inventor
John A. Allen
Herbert E. Dowell
By Howard Riche
Attorney March 31, 1931.  J. A. ALLEN ET AL  1,798,775
AUTOMATIC TOBACCO SCRAP MEASURING MACHINE
Filed July 2, 1927    4 Sheets-Sheet 4

Inventor
John A. Allen
Herbert E. Dowell
By Howard Peele, Attorney

Patented Mar. 31, 1931

1,798,775

UNITED STATES PATENT OFFICE

JOHN A. ALLEN AND HERBERT E. DOWELL, OF ST. PAUL, MINNESOTA

AUTOMATIC TOBACCO-SCRAP-MEASURING MACHINE

Application filed July 2, 1927. Serial No. 203,223.

Our invention relates to an automatic tobacco scrap measuring machine wherein the tobacco scrap may be contained within a compartment and lifted out of the same as it is desired and adapted to be deposited into a means for weighing the scrap into predetermined quantities.

It is also a feature of our invention to provide a scrap weighing and rolling machine wherein after the scrap is weighed it is automatically discharged into a means for rolling it into a binder in a manner to provide the core of a cigar. The feature of the invention of importance in this respect is the uniform weighing of the scrap and the rolling of the same so that all of the cigars are of a uniform nature, having approximately the same weight and substantially the same core. By means of our weighing and rolling machine an increase in production over old methods is materially apparent.

A further feature of our invention resides in means wherein the machine is designed to prevent the picking up of fine screenings in the scrap. The reservoir for the scrap is constructed with a mesh bottom and side so that the fine screenings will pass through the same, while only the desirable scrap is carried up for use. The peculiar features of our machine permit the use of the ordinary binder for the bunches of scrap which form the core of the cigars, and even a small binder can be used for mold work where the bunches forming the cigars are molded into the proper shape. Our machine is adaptable to any size scrap which is usable for cigar fillings or bunches. We have found that in operation our machine does not wrinkle, buckle or tear the binder. This is a feature which is of primary importance as it increases the production and provides a larger percentage of satisfactory work to be turned out by the machine.

Our invention includes a means of adjustably setting the weighing mechanism so that it will operate in a manner to properly weigh a predetermined amount of scrap for each bunch or core, and means for automatically stopping the mechanism by electrical operation as soon as the proper amount of scrap has been weighed. The machine further includes automatic means for starting the machine in operation to fill the scrap into the weighing cup as soon as the cup is emptied. A spreader is provided which is adapted to spread the scrap so that it may enter the weighing cup in a uniform manner. This is important in the operation of the machine. We believe that the proper spreading of the scrap in a manner so that it enters the weighing cup permits the scrap to lie in longitudinal and parallel relation in the cup and it is thus in this same manner discharged into the rolling mechanism, thereby permitting our machine to operate so as not to tear the binders as the scrap is rolled within the same. The machine also is provided with means of forming a cup in the apron for receiving the scrap just before it is rolled into the bunch.

These features, together with other details and objects of the invention setting forth the peculiar construction and the particular arrangement of parts will be more fully and clearly set forth in the specification and claims.

In the drawings forming part of this specification:

Figure 1 is a side sectional view of our automatic tobacco scrap weighing and binding machine.

Figure 2 is a detail in perspective of the side frame of the same.

Figure 3 is a detail of the operating belt showing a portion thereof.

Figures 11, 12, 13:
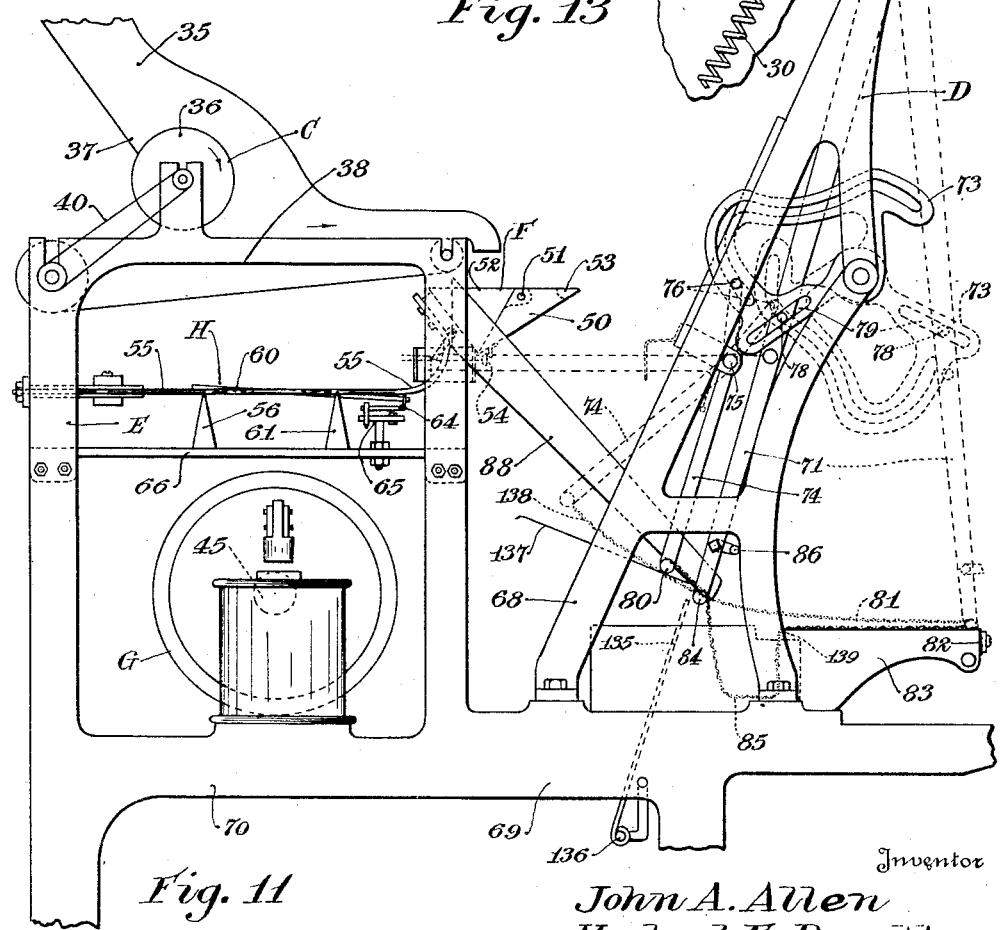
Figure 11 is an enlarged detail side view of a portion of our machine showing the weighing mechanism and the rolling mechanism associated together, and the spreading roller in connection with the carrying belt.

Figure 12 diagrammatically illustrates the wiring of the operating parts which are adapted to electrically operate our machine.

Figure 13 is an enlarged detail of a portion of our machine.

We have illustrated in the drawings our automatic tobacco scrap measuring and rolling machine which is provided with a scrap receiving compartment A, an elevating mechanism B, a spreading mechanism C, and a rolling mechanism D. These parts are connected together in a manner so as to be operated automatically to weigh a predetermined amount of tobacco scrap after it has been elevated and spread out so that the scrap can be discharged into the rolling mechanism which is operated by hand to roll the scrap in bunches with a binder about the same.

The receiving compartment A is provided with an angle iron frame 10, side walls 11 and a screen bottom 12.

An elevator mechanism B extends into the compartment A with its lower end 13 in close proximity to the screen bottom 12 and with the upper end 14 extending up from the compartment A and supported by the side portions 15 which are formed as a part of the sides 11 and project above the same. The lower end 13 of the elevator mechanism B is adjustably positioned in the slot 16 formed in the sides 11 of the compartment A. An endless carrier belt 17 is provided for the elevator B and by means of the wire shelves 18 which are supported by the plates 19 to the belt 17, the tobacco scrap is elevated on the shelves 18 in the operation of the elevator mechanism B. By means of a suitable brush 20 positioned near the top of the compartment A, the projecting or surplus portion of the tobacco scrap picked up by the conveyor B is brushed off of the shelves 18 as they pass by the brush 20. This permits practically a uniform amount of scrap to be picked up by the shelves 18.

The screen bottom 12 permits the fine screenings in the tobacco scrap to drop through from the compartment A to the floor. We also provide a screening member 21 in the compartment A which extends at an angle toward the end 13 of the conveyor, thereby providing a long slanting wall which has a tendency to screen the scrap as it is poured into the compartment A. This permits the fine material to be sifted out of the scrap quite completely, nevertheless, the lifting shelves 18 are of an open wire construction as illustrated in Figure 3 so that any little fine material may drop through the same and not be elevated up to the spreading mechanism C.

When the tobacco scrap is lifted by the shelves 18 up to the top of the conveyor 14 it is adapted to be dumped against the adjustable and sliding shelf 23. This shelf is positioned between the side walls 15. The shelf 23 is formed with a short portion 24 which is hinged at 25 to the side walls. The plate portion 26 of the shelf 23 is adapted to extend beneath the inturned lips 27 formed on the short portion 24 and freely disposed beneath the lips 27 so that the plate portion 26 can slide back and forth. A pintle member 28 is secured to the plate 26 and is adapted to bear against the bracket guide 29, while a spring 30 holds the pintle against the bracket 29, and a second spring 31 pulls the pintle 28 toward the hinging point 25 of the short member 24. The free end 32 of the plate 26 is adapted to bear slightly against the upper end 14 of the conveyor B. A cam member 33 is positioned above the pintle 28 so that the pintle 28 may be guided up over the cam when the free end 32 of the shelf 23 is forced downward by the shelves 18 as they pass by the shelf 23. This adjustable shelf 23 receives the tobacco scrap as it is discharged on the same and the shelf 23 is adapted to slide with the pintle member 28 up over the cam 33, thus providing an adjustable receiving shelf for the tobacco scrap as it is dumped from the conveyor B at the top 14.

As the tobacco scrap is dumped on to the plate 23 it is adapted to slide down the chute or channel 35 and on to the spreading roller 36. The spreading roller 36 is rotated in the direction of the arrow illustrated in Figure 11 and receives the tobacco scrap in the pocket portion 37 formed by the lower part of the chute 35 and the surface of the spreading roller 36. The roller 36 is of any suitable material having a textile cover or other suitable covering material over the same and adapted to pick up the tobacco scrap from the pocket portion 37 and carry it over the periphery of the roller 36 and dump it on to the conveyor 38. The conveyor 38 is operated in the direction of the arrow toward the front of the frame E which supports the weighing mechanism of our machine.

Figure 4:
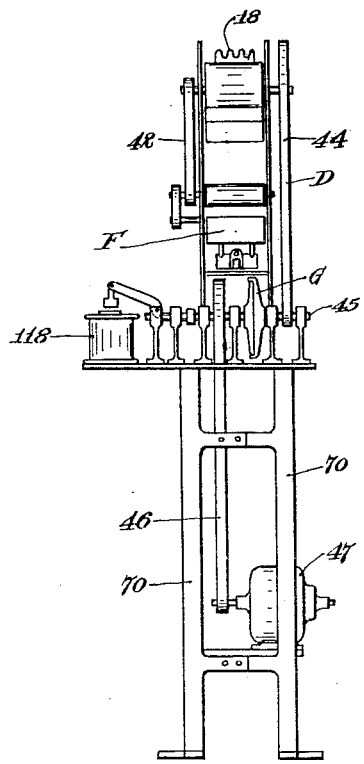
Figure 4 is a front elevation of our machine.
Figure 5:
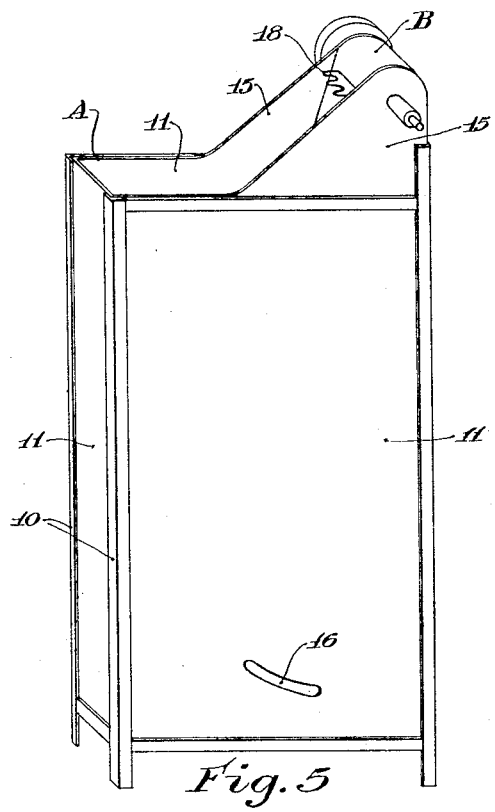
Figure 5 is a perspective of the storage compartment for the tobacco scrap, showing the same separated from the front frame of the machine.
Figure 6:
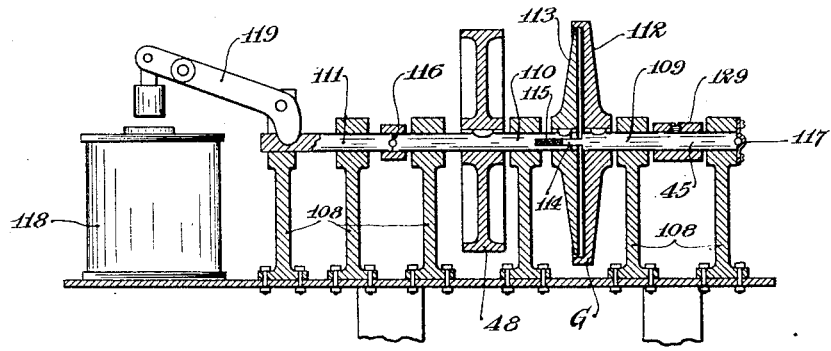
Figure 6 is a diagrammatic sectional view of the operating shaft and clutch and solenoid of our machine.
Figure 7:
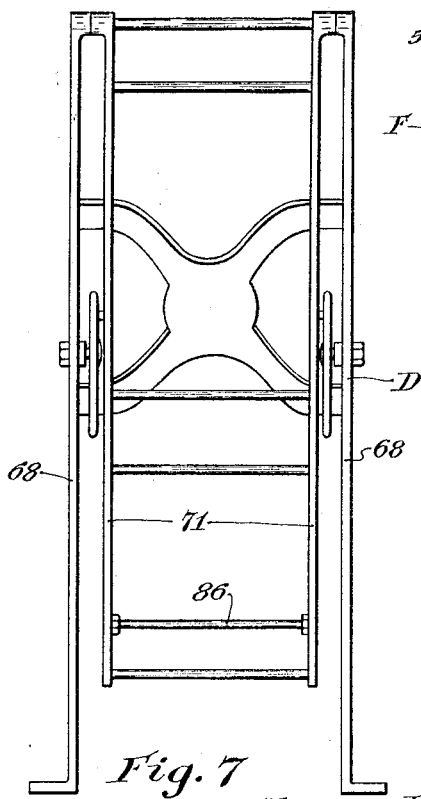
Figure 7 is a front view of the rolling mechanism of our machine.
Figure 8:
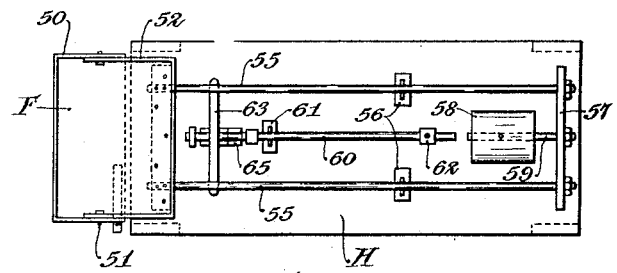
Figure 8 is a plan view of the weighing mechanism and scrap receiving cup.
Figure 9:
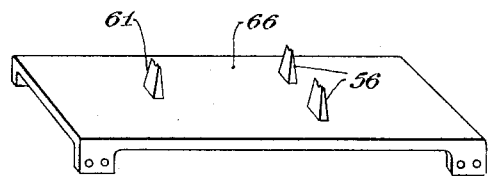
Figure 9 is a perspective view of the table adapted to receive the weighing mechanism.

The roller 36 is operated by the belt 40 from the shaft 41 and the shaft 41 is operated by the belt 42 which extends from the shaft 43 at the upper end 14 of the conveyor B. The shaft 43 is operated by the belt 44 from the shaft 45 which shaft is operated by the belt 46 from the motor 47. The shaft 45 is the main drive shaft of our machine and the belt 46 is adapted to extend over the pulley 48 carried by this shaft, which is illustrated in Figure 6.

The belt 38 extends along the frame E to the front of the same and is adapted to carry the tobacco scrap into the weighing cup F. The belt 38 extends beneath the spreading roll 36. As the tobacco scrap is dropped into the pocket 37 and against the spreading roll 36 it is picked up and carried over on the belt 38 which is operating at the same time that the spreading roll 36 is in operation. This spreads the tobacco scrap out and has a tendency to extend it in parallel and longitudinal relation so that when it is dropped into the weighing cup F the scrap is inclined to lie in a stacked longitudinal relation, one piece to the other. The weighing cup is formed with a hinged front portion 50 which is pivoted at 51 to the back portion 52. The portion 50 is counterbalanced at 53 so as to hold the free edge 54 of the bottom portion normally in closed position. The weighing mechanism H is supported by the frame E which includes the arms 55 which support the cup F between the frame E and which are adapted to rest against the balancing blocks 56, while the free end of the arms 55 are joined together by the cross member 57 and are adapted to adjustably carry the weight 58 on the rod 59 which is attached to the cross member 57. The weighing mechanism for the cup F is also provided with a fine adjustment for balancing the cup F which includes the rod 60 which is adapted to rest upon the balancing block 61 and which is provided with an adjustable weight 62 on its free end, while the other end is connected by the cross member 63 to the members 55. The rod 60 is provided with an arm 64 depending from the same, see Figure 11, which is adapted to provide the connecting arm for the electric switch 65. The electric switch 65 is adjustably connected to the plate 66 upon which the balancing blocks 56 and 61 are positioned. The switch 65 is located directly below the rod 60 at the front end of the same. The function of this switch together with the connecting circuit will be hereinafter more fully described.

Figure 10:
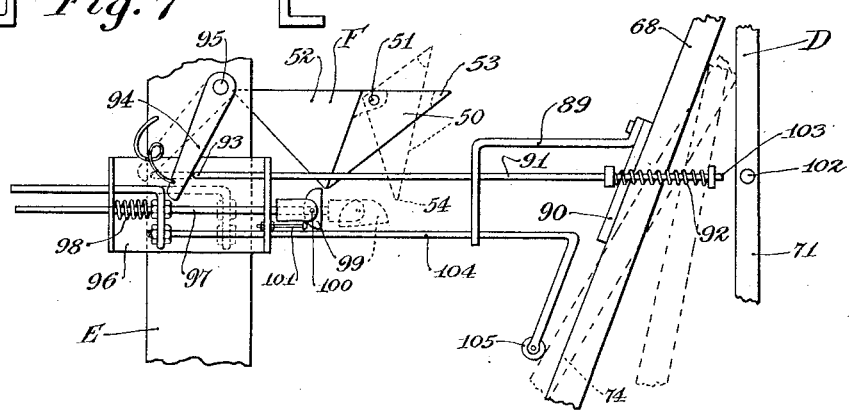
Figure 10 is a diagrammatic side view of a portion of our machine showing the weighing cup and releasing mechanism.

The weighing cup F is adapted to be operated so as to cause the hinged portion 50 to be opened as illustrated in Figure 10, when the rolling mechanism D is operated into backward position. The rolling mechanism D is provided with a frame 68 which is supported by the forwardly projecting portion 69 of the frame 70 of our machine, directly in front of the frame E which carries the spreading and weighing mechinsm. The rolling mechanism is formed with an operating arm 71 which is pivotally secured at 72 at the top of the frame 68 and this operating arm is connected to the cam member 73 which is adapted to operate the lever 74 to cause the same to move in a backward direction, as illustrated in dotted outline in Figure 11, in the operation of the rolling mechanism. The forward movement of the operating arm 71 is illustrated in dotted outline in Figure 11, while the different positions of the cam is also illustrated in dotted outline in this figure. The lever 74 is pivoted at 75, while the upper end 76 of the same is adapted to operate in the slot 77 formed in the cam 73. The lever 71 is provided with a pin 78 which operates in the slot 79 of the cam 73.

The lower end of the lever 74 is connected at 80 to one end of the rolling belt 81, while the other end of the rolling belt is held beneath the clamp 82 on the front of the table 83 of the rolling mechanism D. The lower free end 84 of the arm 71 is adapted to extend beneath the rolling belt 81 in backward position, and the belt 81 is provided with sufficient slack so that when the operating arm 71 is in backward position, or as illustrated in full lines, the belt 81 is adapted to extend and drop down into a recess in the table 83 to form a pocket 85 in the belt 81. The lever 71 is formed with a hand engaging portion 86 which permits the lever 71 to be engaged by hand and operated to pull it into forward position as illustrated in dotted outline in Figure 11.

In the operation of the rolling mechanism D the handle 86 is engaged and the lever 71 pulled forward into the dotted position illustrated. As the lever 71 is operated in this manner the belt 81 is adapted to be drawn over the free end 84 of the lever 71 and the cam 73 is operated into position to cause the lever 74 to move backward into the position illustrated in dotted outline, taking up the slack of the belt 81 and rolling the contents of the tobacco scrap which has been dropped into the pocket 85 between the sides of the rolling belt 81 and to roll the same into the desired shape. A tobacco-leaf binder is laid down and spread out upon the belt 81 when the lever 71 is in backward position so that when the lever 71 is pulled forward the contents of the pocket 85 is rolled into the binder in a smooth and finished manner so that the tobacco scrap is completely bound in a roll with the binder about the same time the free end 84 of the lever 71 reaches the forward end of the table 83.

The cup F is connected by a chute 88 with the pocket 85 so that when the cup F is opened the contents of the same drops down the chute 88 and into the pocket 85. The frame 68 of the rolling mechanism D is provided with a support or bracket 89 and a plate 90 which support the operating rod 91, as illustrated in Figure 10. The operating rod 91 is held in position by the coil spring 92 with the free end 93 engaging against the releasing dog 94. This dog is pivoted at 95 to the frame E directly adjacent the weighing cup F and in back of the same. By means of a bracket 96 a trigger member 97 is supported to the frame E and is adapted to be held against the coil spring 98 when the dog 94 is in the position illustrated in Figure 10 with the latch 99 held in the position illustrated in full lines. The latch 99 is pivoted at 100 to the trigger rod 97 and is caused to move in upright position as illustrated by the adjustable arm 101. The latch 99 is adapted to engage the lower free edge 54 of the portion 50 of the cup F to open the same into the position illustrated in dotted outline in Figure 10, when the lever 71 is moved into backward position with the bar 102 carried by the lever 71 engaging against the end 103 of the rod 91. Thus when the lever 71 is moved into backward position the end 93 of the rod 91 will strike against the dog 94 and release the trigger rod 97 and cause the latch 99 to snap against the lower edge 54 of the cup F and quickly swing the portion 50 into open position, dumping the contents of the tobacco scrap into the chute 88 which slides in its approximate stacked condition into the recess 85 in the belt 81. The counterweight 53 on the portion 50 of the cup F causes it to assume its closed position as soon as the cup F is emptied. The trigger rod 97 is moved back into normal position with the latch 99 engaging the same, as illustrated in full lines in Figure 10, by means of the rod 104 which is formed with a depending end carrying the roller 105 which is engaged by the lever 74 as it moves in its backward position, as illustrated in dotted outline in Figure 10.

When the trigger rod 97 is released by the rod 91 which raises the dog 94, the spring 98 shoots the latch 99 against the lower edge of the portion 50 of the cup F to open it. When the latch 99 is in the extreme forward position as illustrated in dotted outline in Figure 10 it rotates on its pivot point 100 to drop into the position illustrated so that when it is pushed back by the rods 104 in the backward movement of the rod 74 it will clear the bottom of the cup F, but as the lower edge of the latch strikes the arm 101 the latch is raised into operating position as illustrated in Figure 10 in full lines thus setting the latch automatically into operative position to open the cup F quickly when the trigger 97 is released. In the operation of the machine, which will be hereinafter described, as the cup F is filled and the contents of the same is wanted by the operator on the table 93, the contents of the cup is released automatically and the operating parts of our machine are adapted to begin to function immediately. This operation will be hereinafter described.

The countershaft 45 is supported by the frame 70 below the frame E by the bearing members 108. This shaft is divided into portions 109, 110 and 111, all of which portions extend coaxial through the bearings 108. The portion 109 is adapted to carry the friction clutch member 112 which is keyed to the shaft portion 109 so as to rotate with the same. An engaging plate 113 which is adapted to engage the clutch member 112 is keyed to the shaft portion 110 and adapted to rotate with this portion of the shaft. A stud 114 is formed on the end of the shaft 109 adjacent the end of the shaft 110 which is adapted to project into a recess formed in the shaft 110 and by means of a coil spring 115 within the recess in the shaft 110, the plate member of the clutch G, formed by the members 112 and 113, is at times held out of engagement with the member 112. The portion 111 of the shaft 45 does not rotate and a suitable ball thrust bearing 116 is interposed between the end of this shaft and the end of the shaft 110 adjacent the same. We also provide a ball thrust bearing 117 on the outer end of the shaft portion 109.

The clutch G is adapted to be operated by the solenoid 118 which is connected by the lever 119 to the portion 111 of the shaft 45. When the solenoid 118 is operated it will force the portion 111 against the portion 110, thereby causing the plate 113 to engage the clutch member 112. The motor 47 is adapted to operate the belt 46 which extends over the pulleys 48 carried by the countershaft 45 and which is keyed to the portion 110 of the same. Normally the motor 47 operates the portion 110 of the shaft 45 to continue to rotate the same when the motor is turned on and not until the solenoid 118 is in operation do the other parts of our tobacco scrap machine function.

Our machine is provided with circuit-breaking solenoid 120 which is positioned back of the countershaft 45 and is only partly illustrated in the drawings in Figure 1. To clearly illustrate the wiring diagram and electrical operation of the parts in our machine we have illustrated diagrammatically in Figure 12 the wiring diagram with the solenoids and electrical switches. In this illustration the line current comes in on the wire 121 and the wire 122. The motor 47 is connected by the lead 123 and the wire 124 which connects with the hand switch 125. The hand switch then connects back to the line through the wire 121. Thus when the switch 125 is closed the motor 47 will be operated from the line current through the leads 121 and 122 through the leads 123 and 124. Normally the motor 47 is operating continuously when the machine is turned on and the switch 125 is closed. The solenoid 118 is connected with the lead 122 and by means of the lead 126 the solenoid 118 with the circuit breaker solenoid through the switch 127 and from the switch 127 the lead 128 connects the solenoid 118 with the switch 125 and back to the line wire 121. This completes the circuit so that the solenoid 118 is in operation to hold the clutch G operating, thereby rotating the countershaft 45 and operating the pulley 129 which is connected by the belt 44 to the shaft 43. Thus when the clutch G is closed the conveyor B is adapted to elevate the scrap from the compartment A and the spreader is operated through the belt 42 and the short belt 40, while the belt 38 is also in operation and the scrap is adapted to be carried to the cup F. When the cup F has been filled with the amount of scrap for which it has been set to receive, that is the predetermined amount gauged by the scale mechanism H, it is adapted to close the switch 65, thus closing the circuit to the break solenoid 120 which opens the switch 127 and breaks the circuit in the solenoid 118, releasing the clutch G and immediately stopping the elevating mechanism E and the spreading mechanism which is adapted to fill the cup F. This construction provides an electrical automatic means for weighing a predetermined amount of tobacco scrap into the cup F in the operation of our machine. The solenoid 120 is connected to the line 121 through the switch 125 by the leads 130 and 131 through the switch 65 and the lead 132 connects with the line 122. Our automatic tobacco scrap measuring machine is adapted to operate electrically so that the motor 47 will automatically operate to cause the conveyor mechanism B to bring the tobacco scrap to the spreading mechanism C and the spreading mechanism C automatically fills the weighing cup F, whereupon the weighing cup automatically closes the switch 65 which automatically and instantly stops the function of the solenoid 118, stopping the clutch G and thus stopping the spreading mechanism from the compartment A to the cup F. The cup F holds the tobacco scrap in virtually stacked relation with the scrap extending comparatively longitudinally and parallel to each other until it is desired for use.

The operator of our machine is positioned in front of the rolling mechanism D and by engaging the handle 86 the lever 71 is drawn forward which rolls the tobacco scrap which has been discharged into the pocket 85 into a binder which has been placed on the belt 81 on the table 83. The spreading and stacking of the tobacco scrap as hereafter described forms an important feature of our invention as it lays the particles of scrap in longitudinal relation and permits the same to be rolled in the binder without wrinkling, buckling or tearing the same, thereby permitting the operator of our machine to turn out better work more rapidly and with much more ease of operation than has ever been done heretofore in so far as we know.

We provide our rolling mechanism D with a guard member 135 which is pivoted at 136 and is formed of an angular nature having the shelf portion 137 which normally projects back under the chute 88 as clearly illustrated in Figure 11. In operating the rolling mechanism as the handle 86 is engaged to pull the lever 71 forward to roll the scrap in the pocket 85 the slack portion 138 of the belt 81 is carried backward by the arm 74 and the guard 135 to the free end 84 of the lever 71 until it engages with the corner 139 of the table 83 so that the shelf 137 of the guard 135 closes the opening between the end of the chute 88 and the table 83 when the lever 71 is pulled forward and the scrap is being rolled between the sides of the belt 81. Thus the table 83 forms a smooth surface on which the slack portion 138 is adapted to rest and the belt is adapted to slide in a flat smooth state over the same while the free end 84 pushes the guard 135 back into normal position, as illustrated in Figure 11. This performs a very important function in our invention in the rolling mechanism as it causes the belt 81 to drop automatically into the pocket 85 or in shape to form the pocket 85 at the back of the table 83. Without this guard 135 the belt 81 would buckle and would not automatically form itself into the pocket shape 85 as illustrated in Figure 11. This pocket receives the tobacco scrap from the cup F and as the pocket is formed by the drop in the belt 81 it is readily apprehended the importance of the forming of this pocket to receive the scrap without the attention of the operator so that the operator may lay the binder on the belt and give all attention to having the binder smooth and in position ready to receive the scrap as it is rolled between the sides of the belt 81 when the lever 71 is pulled forward.

As the operator completes the rolling operation by pulling the lever 71 forward, the lever 71 is then moved backward into the position illustrated in full lines in Figure 11, and in this operation the lever 71 automatically trips the trigger rod 97 which automatically opens the cup F and discharges the tobacco scrap in the cup F which has been properly weighed, down the chute 88 into the pocket 85. The moment the cup F has been emptied the switch 65 is opened and the circuit through the solenoid 118 is simultaneously closed by the closing of the switch 127, and immediately automatically the elevating and spreading mechanism of our machine starts to operate in a manner to again fill the cup F with tobacco scrap. This operation is continued so that the moment the cup F is filled the mechanism is automatically stopped and not until the operator releases the contents of the cup F does the filling and spreading mechanism start in operation. This permits the operator to control the operation of our machine through the rolling mechanism and to operate the same just as rapidly as desired.

The operation of the rolling mechanism is very simple and does not require skilled labor and as all the mechanism of elevating and spreading and filling the scrap to the weighing cup F is automatic, the operator needs only to give attention to the rolling of the same in the binder. We have found that through the simple and effective operation of the parts of our machine a greater production can be secured with our machine than has ever been accomplished heretofore with any other device that we know of.

The electrical operation of our automatic scrap weighing and rolling machine permits the parts to function quickly and accurately so that the amount of scrap rolled into each binder is practically the same, thereby giving a uniform body for a scale, a feature which is very important in a machine of this nature. The screening of the scrap, the open shelves, the spreader roller, all provide means which function together to give the desired operation of our machine. The double adjustment in the weighing mechanism is of importance as it is clearly evident that the weighing mechanism operates the starting and stopping of the filling of the cup of our machine, thus gauging the exact amount of scrap which is rolled in each binder. Further, the rolling mechanism functions with the weighing cup and mechanism to start and stop the machine at the proper intervals. Our machine permits practically perfect work to be accomplished without a skilled operator, thus decreasing the cost of manufacture and also increasing the speed in production.

In accordance with the patent statutes we have described the principal features of our machine and the details of construction, and while we have illustrated a particular formation and design in the drawings, we wish to have it understood that the same is only suggestive of a means of carrying out our invention, and that the same may be carried out by other means and applied to uses other than those above set forth within the scope of the following claims.

We claim:

1. An automatic scrap measuring and rolling machine having means for receiving the scrap, means for screening the scrap, means for carrying the scrap, means for spreading the scrap to cause the same to be spread out unto a conveying means, a weighing cup associated with said conveying means, and electrical means for stopping the operation of said conveying and spreading means operated automatically.

2. A tobacco scrap measuring and rolling machine comprising, means for receiving the bulk scrap, screening means, means for conveying the scrap from the receiving compartment, means associated with the conveying means for spreading the scrap, an auxiliary conveyor associated with said spreading means, weighing means for measuring out a predetermined amount of scrap as it comes from said auxiliary conveyor, an electrical means associated with said weighing means for stopping said conveyor spreading means and auxiliary conveyor automatically when the proper amount of tobacco scrap is weighed out.

3. An automatic tobacco scrap measuring machine comprising, a compartment for receiving bulk tobacco scrap, weighing means for measuring a predetermined amount of tobacco scrap, a conveyor leading from said compartment to said weighing means, and electrical means for automatically operating said conveying means and means for automatically stopping said operating means.

4. An automatically operated tobacco scrap weighing device including, a receptable for receiving bulk tobacco scrap, weighing means, conveying means for carrying the tobacco scrap to said weighing means, and electrical means operated by said weighing means to shut off said conveying means automatically when said weighing means has received a predetermined amount of tobacco scrap.

5. An automatic tobacco scrap weighing and rolling machine comprising a compartment for bulk scrap, weighing means, a conveying means extending from said bulk compartment to said weighing means, spreading means interposed in said conveying means, rolling means adjacent said weighing means, means for automatically stopping said conveying means by said weighing means, and means for automatically releasing the tobacco scrap from said weighing means and simultaneously starting the operation of said conveying means leading to said weighing means.

6. A tobacco scrap machine including, a scrap receiving compartment, screening means in said compartment, weighing means, conveying means adapted to carry tobacco scrap from said compartment to said weighing means, a receiving cup in said weighing means, a rolling means including a belt for rolling the tobacco scrap, means for automatically releasing the scrap from said cup, and a pocket formed in said belt in said rolling means adapted to receive the released scrap by gravity.

7. A tobacco scrap machine having weighing means, rolling means associated with said weighing means, conveyor means for conveying tobacco scrap to said weighing means, means for automatically stopping said conveying means when said weighing means has received and weighed a desired amount of tobacco scrap, and means operated by said rolling means for discharging the tobacco scrap from said weighing means and to simultaneously stop said conveying means.

8. A tobacco scrap machine comprising, a scrap receiving compartment, a conveyor for elevating the scrap out of said compartment, a series of wire shelves formed on said conveyor, a screen extending angularly within said compartment, a screen along the bottom of said compartment to screen the tobacco scrap, brush means for limiting the amount of scrap carried by said shelves on said conveyor, a chute leading from said conveyor, an auxiliary conveyor connected with said chute adapted to extend horizontally, a weighing cup associated with said auxiliary conveyor, weighing means for balancing said cup for a predetermined amount of scrap, electrical means associated with said weighing means, for starting and stopping said conveyors automatically, and means for releasing the scrap from said cup and simultaneously causing said conveyors to be operated.

9. A tobacco scrap machine including a weighing cup, means for balancing said cup to weigh out a predetermined amount of tobacco scrap, means for opening said cup, and means for balancing said cup to cause the same to automatically close after it has been opened and the contents thereof discharged.

10. A tobacco scrap rolling machine comprising a rolling belt, means for rolling the belt upon itself to roll tobacco scrap therebetween, shelf and guard means for permitting said belt to be stretched smoothly over the same, and a recess in said rolling machine adjacent said guard means whereby when said guard is moved by the backward movement of the operating member of said rolling machine, said belt is adapted to drop to automatically form a pocket for receiving tobacco scrap.

11. A tobacco rolling machine including, a rolling mechanism, a belt for rolling tobacco scrap therebetween, means for causing a portion of the belt to be rolled over onto another portion of the belt, means adapted to form a pocket in said belt to receive tobacco scrap, weighing means associated with said rolling belt, means for conveying tobacco scrap to said weighing means, means for stopping said conveying means when said weighing means receives the desired amount of tobacco scrap, and means for automatically releasing the tobacco scrap from said weighing means in a manner to discharge the same into the pocket in said belt of said rolling mechanism.

12. A tobacco scrap machine including, a rolling table, a belt adapted to extend over said table, a recess in said table to permit said belt to drop into said recess, a weighing means associated with said rolling table, means for automatically releasing said weighing means to discharge tobacco scrap therefrom into said pocket in said rolling table, a conveyor means connected to said weighing means, and means for automatically starting the operation of said conveyor means simultaneously with the releasing of the tobacco scrap from said weighing means.

13. A tobacco scrap machine including, a weighing scale, a cup carried by said scale, balance arms extending from said cup, an adjustable weight connected to said balance arms, an auxiliary balance arm connected to said first balance arms, a weight adjustably positioned on said auxiliary arm, an electrical switch associated with said auxiliary balance arm, a conveyor for carrying tobacco scrap to said cup, and electrical means for starting and stopping said conveyor when said cup is empty and filled respectively.

14. A tobacco scrap machine having, a weighing cup, means for automatically opening said cup, a conveyor leading to said cup, a spreader interposed in said conveyor, a countershaft, a clutch carried by said countershaft, and electrical means for operating said countershaft and clutch to start and stop said conveyor means to said cup.

15. Weighing means for a tobacco scrap machine including, a cup, balancing means adapted to support said cup, means for opening said cup by a trigger member adapted to strike against a portion of said cup to open the same, and means for balancing the opening position of said cup in a manner to cause it to close automatically as soon as the cup has been emptied.

16. A tobacco scrap machine adapted to be operated electrically including, weighing means, conveying means leading to said weighing means, rolling means associated with said weighing means, means for automatically discharging the tobacco scrap from the weighing means to the rolling means, electrical means for operating said conveying means including, a solenoid for holding the operating clutch of said machine in operative position and means for breaking the circuit of said solenoid to stop said conveying means.

17. An electrically operated tobacco scrap machine including, rolling means adapted to roll the tobacco scrap in a binder, weighing means for measuring a predetermined amount of tobacco scrap to be rolled in the binder, a conveyor to said weighing means, means for electrically operating said conveyor, electrical means for disengaging said operating means automatically upon the desired amount of tobacco scrap being discharged from said conveyor into said weighing means, and electrical means for automatically starting said conveying means when said weighing means is empty, said rolling means controlling the discharge of the tobacco scrap from said weighing means.

18. An electrically operated tobacco scrap machine including, a weighing means, a clutch means, a conveying means, an electric circuit for operating said clutch, an electric circuit associated with said weighing means, and switch means for breaking the circuit of the source of power to said clutch operating circuit to stop said conveying means when a predetermined amount of tobacco scrap has been conveyed thereto.

19. An electrically operated tobacco scrap machine including, a conveying means, an electric motor for operating said conveying means, a clutch interposed between said motor and said conveying means, a solenoid for operating said clutch, and means for operating said solenoid to release said clutch when the desired amount of tobacco scrap has been carried to said weighing means by said conveying means.

20. An electrically operated tobacco scrap machine including, a conveying means, an electric motor for operating said conveying means, a clutch interposed between said motor and said conveying means, a solenoid for operating said clutch, and electric means for automatically operating said solenoid to cause said conveyor means to be operated by said motor when said weighing means is empty.

21. A tobacco scrap machine including, weighing mechanism for receiving a predetermined amount of tobacco scrap, conveying and spreading means leading to said weighing mechanism to stack tobacco scrap in approximate longitudinal relation in said weighing means, electric means for operating said conveying means, and electric means for stopping the operation of said conveying means by breaking the circuit which operates said conveying means.

J. ALBERT ALLEN.
HERBERT E. DOWELL.